April 14, 1964

H. J. OLDHAM 3,128,600

MULTILEVEL SOLID PROPELLANT ROCKET MOTOR

Filed May 18, 1960

INVENTOR.
Herman J. Oldham
BY
Curtis, Morris & Safford
ATTORNEYS 3,128,600
MULTILEVEL SOLID PROPELLANT
ROCKET MOTOR
Herman J. Oldham, New Hope, Ala., assignor to
Thiokol Chemical Corporation, Bristol, Pa.
Filed May 18, 1960, Ser. No. 29,951
4 Claims. (Cl. 60—35.6)

This invention relates to a solid propellant rocket motor, and relates in particular to a solid propellant rocket motor having multilevel controllable thrust.

A rocket of this kind comprises a plurality of separately ignitable propellant charges or segments which may be controllably ignited in series to provide thrust for a pre-planned or in-flight thrust program. Thrust cut-off of the motor is possible after burn-out of one or more of the propellant charges. Thrust can be restored by ignition of the rearmost of still unburned charges remaining in the rocket. Such alternate cut-off and burning is advantageous, for example, in reducing overheating and erosion of nozzle portions of the rocket. The structure also affords flexibility in the manner of its construction, since the propellant charges may be precast, thereby avoiding problems of cracking, shrinking, and the like often encountered when using solid propellants. Several types of construction may be combined, e.g. individually ignitable charges of the kind herein described can be combined with a conventional booster charge within the same motor casing to provide high initial thrust. Further, multilevel motors of the kind described may incorporate motor casings of considerable length.

Figure 1:
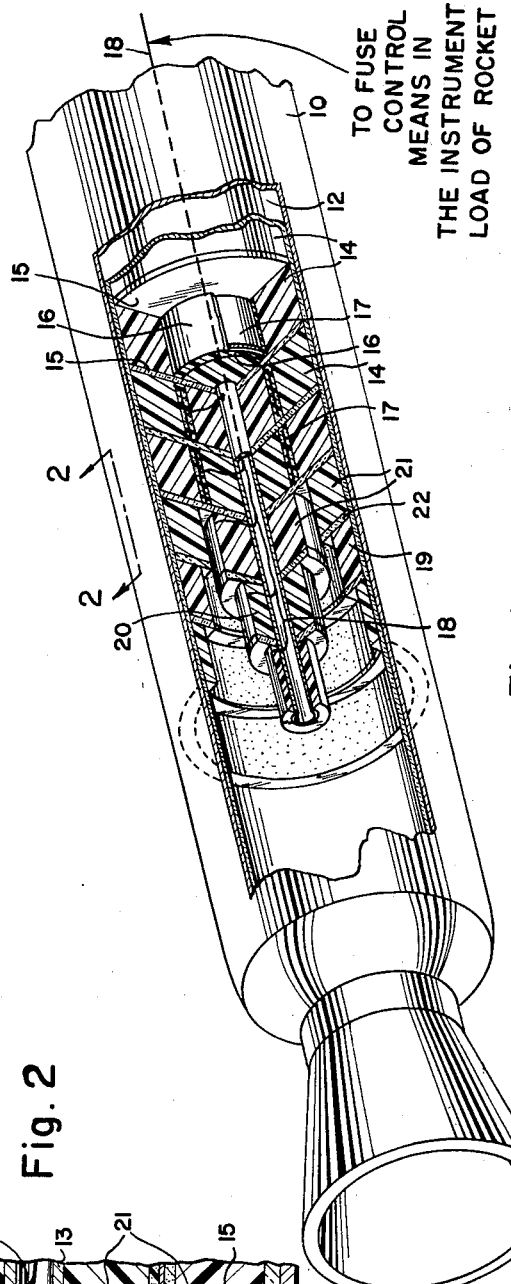
Figure 2:
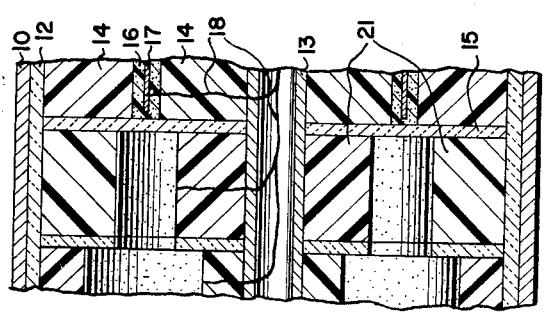

A fuller appreciation of the invention and of its many advantages can be had by reference to the accompanying drawings, in which FIGURE 1 is a perspective view of a rocket motor, broken away to show the segmented propellant charge within the rocket motor; and FIGURE 2 is a side elevation in longitudinal section taken along line 2—2 of FIGURE 1, enlarged to show details of a portion of the propellant charge structure within the rocket motor of FIGURE 1.

FIGURE 1 shows a rocket motor comprising substantially cylindrical motor casing 10, for example of steel, having in aft portions thereof nozzle 11 for escape of gases generated within the motor casing. Within motor casing 10 and lining the walls thereof is liner 12 of an insulating or heat-resistant composition useful for shielding the interior walls of the motor casing from exposure to high temperatures, flames or hot gases.

Running along the central longitudinal axis of motor casing 10 is a central support 13, conveniently in the form of a tube and preferably fashioned from a fusible and/or burnable material such as aluminum or a synthetic resin.

Within motor casing 10, between liner 12 thereof and central support 13 are a plurality of propellant charges 14 bonded to said liner. Each charge comprises a combustible propellant mixture of a type known to the art, for example a composition comprising a natural or synthetic rubber having a finely-divided solid inorganic oxidizing salt such as potassium perchlorate admixed therewith. Each charge 14 of propellant is separated from the charge immediately adjacent it by insulating disc 15, which is fashioned of a frangibly or erodably disintegrable insulating material. For example, disc 15 may be a thin lamina of a synthetic resin. The material comprising disc 15 is insulating, but will break under mechanical stress or erode under the influence of streaming gases at elevated temperatures. A combination of an amine-cured polyepoxide-polysulfide resin with an asbestos filler therein is especially suitable for this purpose. This material can also be used for liner 12.

Embedded within each segment 14 of the propellant charge is band or layer 16 of an easily-ignitable, highly-combustible material, such as a combustible foam—for example a cellulose foam. In turn, embedded in layer 16 is an igniting fuze 17, electrically connected by wires 18 with mechanically or electromagnetically controlled means (not shown), within the instrument load of the rocket, for generating and transmitting an electrical impulse through wires 18 to igniting fuze 17. Each layer 16 is annular, and extends circularly through corresponding segment 14. Each annular layer 16 is of a diameter as to radially bisect said segment 14 forming two concentric annular portions of approximately equal radial thickness. Igniting fuze 17 is similarly of annular or band form, and is conveniently comprised of an ignitable metal foil, for example a magnesium foil.

FIGURE 2 shows casing 10, liner 12, support 13, segmented propellant charge 14, insulating disc 15, ignitable layer 16, igniting fuze 17, and connecting wires 18 in greater detail.

One mode of operation of the rocket is as follows. From mechanical or electromagnetically controlled means within the instrument load (not shown) of the rocket, an electrical impulse is sent through wires 18 to that fuze 17 in the rearmost of propellant segments 14. The electrical impulse ignites fuze 17 (e.g. by resistance heating of magnesium foil comprising the fuze), which in turn ignites highly combustible layer 16 in all portions thereof. The combustion of layer 16 then ignites the two cylindrical opposing faces of the propellant charge segment 14 in which it is embedded, while simultaneously opening a passage for the escape of gases generated by the burning propellant. Referring again to FIGURES 1 and 2, outermost annular portion 19 of the ignited segment burns at its ignited face outwardly toward liner 12. Innermost segment 20 burns at its ignited face inwardly toward support 13. Hot gases are generated under pressure. These gases escape through nozzle 11 and propel the rocket.

Shortly after ignition of the rearmost propellant charge segment, the next-rearmost segment may be ignited by an electrical impulse from the instrument load of the rocket. Hot gases produced by ignition of this second segment will erode, crumble, break or otherwise disintegrate any unsupported portions of such discs 15 interposed between the propellant segment and nozzle 11. FIGURES 1 and 2 show such an arrangement in which propellant segments 21 have been ignited before burnout of segments 19 and 20. The removal of unsupported portions of intervening disc 22 exposed to action of hot gases is shown in the figures. Disc 15 of FIGURE 2 remains intact, however, preserving unignited the next forward segment 14 by its insulating action.

The flexibility of a rocket motor of the type described is evident. Maximum thrust may be obtained, if desired, by decreasing the time between ignition of successive segments until a predetermined maximum number of segments (limited by the structural strength of the casing and not necessarily equal to the total number of segments) is burning simultaneously. By increasing the time between ignition of successive segments, less than this maximum number of segments can be ignited. An initial period of high thrust caused by simultaneous ignition of a plurality of segments may be followed by various combinations of no thrust, low thrust, or high thrust, etc. Constant thrust at maximum or lower levels is obtainable by ignition of the rearmost unburned segment at burnout of the rearmost burning segment.

Radio-control of the mechanism transmitting the igniting impulses can be used to influence the behavior of the rocket in flight by control of the thrust program. Ignition of unburned segments on burnout of ignited segments can easily be accomplished using pressure-sensitive switching means within the motor casing. Upon detecting a pressure drop, the switch activates means for igniting a segment or segments until pressure is restored. The rocket motor operates at discrete thrust levels, but the difference between these levels (determined by the area of the burning surface of the propellant segments and the nature of the propellant) need not be large.

Although specific embodiments have been shown and described, they are illustrative, and are not to be construed as limiting the scope and spirit of the invention.

What is claimed is:

1. A multilevel rocket motor comprising a motor casing having nozzle means, a heat-removable tubular central support longitudinally disposed within said casing, a plurality of charge segments of a solid propellant composition arranged along said tubular central support, each segment comprising an inner annulus adjacent to said support and an outer annulus adjacent to said motor casing and having two lateral surfaces at least one of which faces an adjacent propellant segment, each said segment further having said inner annulus and said outer annulus cast about an ignitable band embedded in said segment, said ignitable band extending only between the lateral surfaces of said segment and comprising electrically actuated fuze means therein, a plurality of disintegrable discoid insulating members separating facing lateral surfaces of adjacent propellant chage segments, control means in said rocket casing for electrically actuating said fuze means, and a plurality of electrically conducting wires connecting said control means and said fuze means and extending through said tubular central support.

2. A rocket motor as in claim 1 wherein said embedded ignitable band comprises a combustible foam having an electrically ignitable metal foil embedded therein as said fuze means.

3. A rocket motor as in claim 2 wherein said combustible foam is a cellulose foam.

4. A rocket motor as in claim 3 wherein said ignitable metal foil is a magnesium foil.

References Cited in the file of this patent

UNITED STATES PATENTS

| | | |
|---|---|---|
| 2,697,325 | Spaulding | Dec. 21, 1954 |
| 2,724,237 | Hickman | Nov. 22, 1955 |
| 2,776,623 | Bonner | Jan. 8, 1957 |
| 2,872,870 | Gey | Feb. 10, 1959 |
| 2,912,820 | Whitmore | Nov. 17, 1959 |
| 2,952,972 | Kimmel et al. | Sept. 20, 1960 |
| 2,956,401 | Kane | Oct. 18, 1960 |
| 2,979,896 | Perkins et al. | Apr. 18, 1961 |
| 2,987,875 | Fox | June 13, 1961 |
| 2,988,877 | Shope | June 20, 1961 |

FOREIGN PATENTS

| | | |
|---|---|---|
| 137,341 | Sweden | Sept. 16, 1952 |
| 807,499 | Great Britain | Jan. 14, 1959 |